UNITED STATES PATENT OFFICE.

ELI THAYER, OF WORCESTER, MASSACHUSETTS.

IMPROVEMENT IN ROOFING COMPOSITIONS.

Specification forming part of Letters Patent No. 164,233, dated June 8, 1875; application filed May 12, 1875.

*To all whom it may concern:*

Be it known that I, ELI THAYER, of Worcester, Massachusetts, have invented a Roofing-Cement.

My invention consists of a new and improved process of manufacturing a cement for covering the roofs of buildings, of which the following is a full and true description:

I take lime and sand, and, after slaking the lime, mix the two substances together thoroughly with water, so as to make a good quality of mortar, such as is used in bricklaying or plastering. With this may be mixed, as required, hair or other fibrous material in small or large proportion, according to the use for which it is made. I then add to this mixture coal-tar, pitch, or other kindred substance at ordinary temperatures, until the water freely leaves the mixture. There then results a very durable and easily-wrought cement for roofing purposes.

I am aware that the same ingredients have been used put together without the use of water; but these make an article very much inferior to this both in quantity and quality, while the work of preparing it is much greater.

In practice it will be found convenient to slightly warm the mixture previous to spreading it upon the roof.

This process of excluding the water wholly or partially from mixtures containing it, by mixing with them tar or other hydrocarbons, is not limited to any particular ingredients composing the aqueous mixture to which it may be applied. It is applicable to almost all mixtures of granulated, pulverized, or fibrous substances with water, whether there be one ingredient besides the water or many. For example, it will apply to a mixture of sand and water. It will also apply if to that mixture there be added lime, Portland cement, Rosendale cement, kaolin, marble-dust, powdered stone, gypsum, charcoal-dust, and many other substances, either singly or collectively.

Having thus fully described my process, what I claim as my invention, and desire to secure by Letters Patent, is—

The process herein described of expelling water from roofing and similar compositions containing it by the use of coal-tar, pitch, or other similar hydrocarbons, substantially as specified.

ELI THAYER.

Witnesses:
ALEX. OSTRANDER,
FRANK RENSEN.